US012640871B2

(12) United States Patent

Brunel

(10) Patent No.: US 12,640,871 B2

(45) Date of Patent: May 26, 2026

(54) EFFICIENT DATA TRANSMISSION IN UNLICENSED SPECTRUM

(71) Applicant: SKYWORKS SOLUTIONS, INC., Irvine, CA (US)

(72) Inventor: Dominique Michel Yves Brunel, Antibes (FR)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 110 days.

(21) Appl. No.: 18/230,275

(22) Filed: Aug. 4, 2023

(65) Prior Publication Data

US 2024/0056250 A1 Feb. 15, 2024

Related U.S. Application Data

(60) Provisional application No. 63/397,114, filed on Aug. 11, 2022.

(51) Int. Cl.
H04W 72/0453 (2023.01)
H04L 5/00 (2006.01)
*H04W 74/0808* (2024.01)

(52) U.S. Cl.
CPC .......... H04L 5/0048 (2013.01); H04L 5/0046 (2013.01); H04W 72/0453 (2013.01)

(58) Field of Classification Search
CPC .................................................. H04L 5/0046
See application file for complete search history.

(56) References Cited

U.S. PATENT DOCUMENTS

| 2017/0195972 A1* | 7/2017 | Drogi | ..................... H03F 3/191 |
| 2020/0351668 A1* | 11/2020 | Kundu | .................. H04W 72/23 |
| 2021/0058970 A1* | 2/2021 | Kwak | .................. H04W 72/23 |
| 2021/0321457 A1* | 10/2021 | Talarico | ............. H04W 74/004 |

(Continued)

FOREIGN PATENT DOCUMENTS

| GB | 2542625 A | * | 3/2017 | ........... H04B 1/0057 |

OTHER PUBLICATIONS

5G Evolution 3GPP R16 R17 Final (Year: 2020).*

(Continued)

*Primary Examiner* — Moo Jeong
*Assistant Examiner* — Theresa Nguyen
(74) *Attorney, Agent, or Firm* — Lando & Anastasi, LLP

(57) ABSTRACT

User equipment and base stations are disclosed. The user equipment comprises a transceiver, at least one processor, and a memory storing instructions that cause the at least one processor to perform operations including receiving uplink scheduling information of a plurality of sub-bands, performing carrier sensing on each of the plurality of sub-bands, determining a transmission frequency band for the uplink transmission based on the carrier sensing, the transmission frequency band including at least one idle sub-band among the plurality of sub-bands that is free for transmission, processing a baseband signal according to a number of sub-bands included in the determined transmission frequency band, shifting a frequency of the processed baseband signal based on a center frequency of the transmission frequency band, generating an RF signal of the adjusted baseband signal, and performing the uplink transmission for the generated RF signal to the base station.

18 Claims, 8 Drawing Sheets

(56)        References Cited

U.S. PATENT DOCUMENTS

2021/0328732  A1*  10/2021  Yi  ..................... H04W 72/0453
2022/0046553  A1*   2/2022  Kim  ..................... H04B 17/345
2023/0026357  A1*   1/2023  Lei  ........................ H04L 5/0092
2024/0204940  A1*   6/2024  Thyagarajan  ......... H04L 5/0057
2025/0176025  A1*   5/2025  Liu  ...................... H04L 5/0092

OTHER PUBLICATIONS

Ciciora et al., "Modern Cable Television Technology", 2004, Morgan Kaufmann, 2nd Edition, Chapter 4—pp. 137-181 (Year: 2004).*
Range Commanders Council Telemetry Group, "Telemetry Systems Radio Frequency Handbook", Jul. 2021, Document 120-21 (Year: 2021).*

* cited by examiner mXn DL MIMO nXm UL MIMO

START

RECEIVING UPLINK SCHEDULING INFORMATION — S502

CONFIGURING POSSIBLE BANDWIDTHS OF TRANSMISSION FREQUENCY BAND — S504

PERFORMING A LBT SENSING — S506

SELECTING ONE OF POSSIBLE BANDWIDTH — S508

GENERATING BASEBAND SIGNAL — S510

SHIFTING FREQUENCY OF THE BASEBAND SIGNAL — S512

GENERATING RF SIGNAL — S514

PERFORMING UPLINK TRANSMISSION — S516

END

START

CONFIGURING DOWNLINK SCHEDULING INFORMATION ~S702

CONFIGURING POSSIBLE BANDWIDTHS OF TRANSMISSION FREQUENCY BAND ~S704

PERFORMING A LBT SENSING ~S706

SELECTING ONE OF POSSIBLE BANDWIDTH ~S708

GENERATING BASEBAND SIGNAL ~S710

SHIFTING FREQUENCY OF THE BASEBAND SIGNAL ~S712

GENERATING RF SIGNAL ~S714

PERFORMING DOWNLINK TRANSMISSION ~S716

END

EFFICIENT DATA TRANSMISSION IN UNLICENSED SPECTRUM

CROSS-REFERENCE TO RELATED APPLICATIONS

This application claims priority under 35 U.S.C. § 119(e) to U.S. Provisional Patent Application Ser. No. 63/397,114, titled "EFFICIENT DATA TRANSMISSION IN UNLICENSED SPECTRUM," filed Aug. 11, 2022, the entire content of which is incorporated herein by reference in its entirety for all purposes.

BACKGROUND

Field

Aspects and embodiments disclosed herein relate to electronic systems, and in particular, to radio frequency (RF) electronics.

Description of the Related Technology

A radio frequency (RF) communication system can include a transceiver, a front end, and one or more antennas for wirelessly transmitting and receiving signals.

Examples of RF communication systems include, but are not limited to, mobile phones, tablets, base stations, network access points, customer-premises equipment (CPE), laptops, and wearable electronics. For example, in wireless devices that communicate using a cellular standard, a wireless local area network (WLAN) standard, and/or any other suitable communication standard, a power amplifier can be used for RF signal amplification. An RF signal can have a frequency in the range of about 30 kHz to 300 GHz, such as in the range of about 410 MHz to about 7.125 GHz for certain communications standards.

SUMMARY

In accordance with one aspect, there is provided a method for a user equipment (UE) configured to perform an uplink transmission in an unlicensed band in a wireless communication system. The method comprises receiving, from a base station (BS), uplink scheduling information of a plurality of sub-bands, performing a carrier sensing on each of the plurality of sub-bands, determining a transmission frequency band for the uplink transmission based on the carrier sensing, the transmission frequency band including at least one idle sub-band among the plurality of sub-bands that is free for transmission, processing a baseband signal according to a number of sub-bands included in the determined transmission frequency band, adjusting the processed baseband signal by shifting frequency of the processed baseband signal based on a center frequency of the transmission frequency band, generating a radio frequency (RF) signal of the adjusted baseband signal, and performing the uplink transmission for the generated RF signal to the BS.

In some embodiments, each of the plurality of sub-bands is bandwidth part (BWP) that is a subset of contiguous radio bears (RBs) on a carrier.

In some embodiments, the processed baseband signal is shifted in frequency by a difference between a center frequency of the plurality of sub-bands and the center frequency of the transmission frequency band.

In some embodiments, the processed baseband signal includes an in-phase (I) signal and a quadrature (Q) signal of the baseband signal.

In some embodiments, the processed baseband signal is shifted to higher frequency range or lower frequency range using a baseband rotator including a plurality of multipliers based on a pre-stored look-up table (LUT).

In some embodiments, the determining the transmission frequency band includes selecting a largest number of contiguous sub-bands among the at least one idle sub-band.

In some embodiments, the determining the transmission frequency band includes selecting at least one sub-band having a lowest frequency range among the at least one idle sub-band.

In some embodiments, the determining the transmission frequency band includes selecting all of the at least one idle sub-bands.

In some embodiments, the transmission frequency band includes non-contiguous idle sub-bands that are free for transmission and at least one busy sub-band that is not available for the transmission.

In some embodiments, processing the baseband signal is performed based on a sequence of the non-contiguous idle sub-bands and the at least one busy sub-band.

In some embodiments, the method further comprises increasing output power of the RF signal before the uplink transmission.

In accordance with another aspect, there is provided a method for a base station (BS) configured to perform downlink transmission in an unlicensed band in a wireless communication system. The method comprises configuring downlink scheduling information of a plurality of sub-bands, performing a carrier sensing on each of the plurality of sub-bands, determining a transmission frequency band for the downlink transmission based on the carrier sensing, the transmission frequency band including at least one idle sub-band among the plurality of sub-bands that is free for transmission, processing a baseband signal according to a number of sub-bands included in the determined transmission frequency band, adjusting the processed baseband signal by shifting frequency of the processed baseband signal based on a center frequency of the transmission frequency band, generating a radio frequency (RF) signal of the adjusted baseband signal, the RF signal having a center frequency set to a center of the transmission frequency band, and performing the downlink transmission for the generated RF signal to a user equipment (UE).

In some embodiments, each of the plurality of sub-bands is bandwidth part (BWP) that is a subset of contiguous radio bears (RBs) on a carrier.

In some embodiments, the processed baseband signal is shifted in frequency by a difference between a center frequency of the plurality of sub-bands and the center frequency of the transmission frequency band.

In some embodiments, the processed baseband signal includes in-phase (I) signal and quadrature (Q) signal of the baseband signal.

In some embodiments, the processed baseband signal is shifted to a higher frequency range or a lower frequency range using a baseband rotator including plurality of multipliers based on a pre-stored look-up table (LUT).

In some embodiments, the determining the transmission frequency band includes selecting a largest number of contiguous sub-bands among the at least one idle sub-band.

In some embodiments, the determining the transmission frequency band includes selecting at least one sub-band having a lowest frequency range among the at least one idle sub-band.

In some embodiments, the determining the transmission frequency band includes selecting all of the at least one idle sub-bands.

In some embodiments, the transmission frequency band includes non-contiguous idle sub-bands that are free for transmission and at least one busy sub-band that is not available for the transmission.

In some embodiments, processing the baseband signal is performed based on a sequence of the non-contiguous idle sub-bands and the at least one busy sub-band.

In some embodiments, the method further comprises increasing output power of the RF signal before the downlink transmission.

In accordance with another aspect, there is provided a user equipment (UE) comprising a transceiver, at least one processor, and at least one computer memory operably connectable to the at least one processor and storing instructions that, when executed, cause the at least one processor to perform operations including receiving, from a base station (BS), uplink scheduling information of a plurality of sub-bands, performing a carrier sensing on each of the plurality of sub-bands, determining a transmission frequency band for the uplink transmission based on the carrier sensing, the transmission frequency band including at least one idle sub-band among the plurality of sub-bands that is free for transmission, processing a baseband signal according to a number of sub-bands included in the determined transmission frequency band, adjusting the processed baseband signal by shifting frequency of the processed baseband signal based on a center frequency of the transmission frequency band, generating a radio frequency (RF) signal of the adjusted baseband signal, and performing the uplink transmission for the generated RF signal to the BS.

In some embodiments, each of the plurality of sub-bands is bandwidth part (BWP) that is a subset of contiguous radio bears (RBs) on a carrier.

In some embodiments, the processed baseband signal is shifted in frequency by a difference between a center frequency of the plurality of sub-bands and the center frequency of the transmission frequency band.

In some embodiments, the processed baseband signal includes in-phase (I) signal and quadrature (Q) signal of the baseband signal.

In some embodiments, the processed baseband signal is shifted to a higher frequency range or a lower frequency range using a baseband rotator including a plurality of multipliers based on pore-stored look-up table (LUT).

In some embodiments, the determining the transmission frequency band includes selecting a largest number of contiguous sub-bands among the at least one idle sub-band.

In some embodiments, the determining the transmission frequency band includes selecting at least one sub-band having a lowest frequency range among the at least one idle sub-band.

In some embodiments, the determining the transmission frequency band includes selecting all of the at least one idle sub-bands.

In some embodiments, the transmission frequency band includes non-contiguous idle sub-bands that are free for transmission and at least one busy sub-band that is not available for the transmission.

In some embodiments, processing the baseband signal is performed based on a sequence of the non-contiguous idle sub-bands and the at least one busy sub-band.

In some embodiments, processing the baseband signal further comprises increasing output power of the RF signal before the uplink transmission.

In accordance with another aspect, there is provided a base station (BS) comprising a transceiver, at least one processor, and at least one computer memory operably connectable to the at least one processor and storing instructions that, when executed, cause the at least one processor to perform operations including configuring downlink scheduling information of a plurality of sub-bands, performing a carrier sensing on each of the plurality of sub-bands, determining a transmission frequency band for the downlink transmission based on the carrier sensing, the transmission frequency band including at least one idle sub-band among the plurality of sub-bands that is free for transmission, processing a baseband signal according to a number of sub-bands included in the determined transmission frequency band, adjusting the processed baseband signal by shifting frequency of the processed baseband signal based on a center frequency of the transmission frequency band, generating a radio frequency (RF) signal of the adjusted baseband signal, the RF signal having a center frequency set to a center of the transmission frequency band, and performing the downlink transmission for the generated RF signal to a user equipment (UE).

In some embodiments, each of the plurality of sub-bands is bandwidth part (BWP) that is a subset of contiguous radio bears (RBs) on a carrier.

In some embodiments, the processed baseband signal is shifted in frequency by a difference between a center frequency of the plurality of sub-bands and the center frequency of the transmission frequency band.

In some embodiments, the processed baseband signal includes in-phase (I) signal and quadrature (Q) signal of the baseband signal.

In some embodiments, the processed baseband signal is shifted to a higher frequency range or a lower frequency range using a baseband rotator including a plurality of multipliers based on a pre-stored look-up table (LUT).

In some embodiments, the determining the transmission frequency band includes selecting a largest number of contiguous sub-bands among the at least one idle sub-band.

In some embodiments, the determining the transmission frequency band includes selecting at least one sub-band having a lowest frequency range among the at least one idle sub-band.

In some embodiments, the determining the transmission frequency band includes selecting all of the at least one idle sub-bands.

In some embodiments, the transmission frequency band includes non-contiguous idle sub-bands that are free for transmission and at least one busy sub-band that is not available for the transmission.

In some embodiments, processing the baseband signal is performed based on a sequence of the non-contiguous idle sub-bands and the at least one busy sub-band.

In some embodiments, processing the baseband signal further comprises increasing output power of the RF signal before the downlink transmission.

BRIEF DESCRIPTION OF THE DRAWINGS

Embodiments of this disclosure will now be described, by way of non-limiting example, with reference to the accompanying drawings. In the drawings.

DETAILED DESCRIPTION OF EMBODIMENTS

Figure 1:
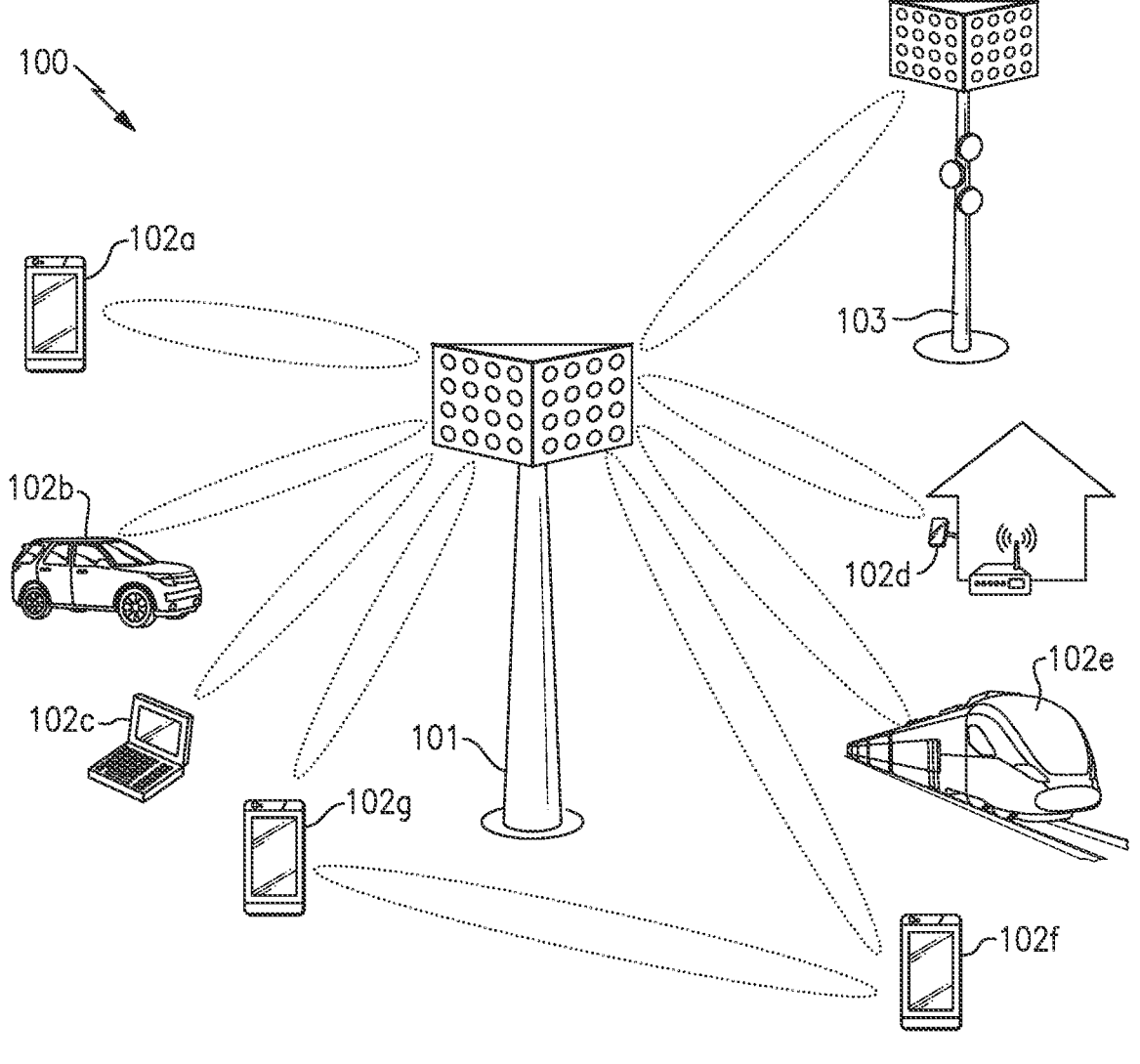
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

FIG. 1 is a schematic diagram of one example of a communication network 100. The communication network 100 includes a macro cell base station 101, a small cell base station 103, and various examples of user equipment (UE), including a first mobile device 102a, a wireless-connected car 102b, a laptop 102c, a stationary wireless device 102d, a wireless-connected train 102e, a second mobile device 102f, and a third mobile device 102g.

Although specific examples of base stations and user equipment are illustrated in FIG. 1, a communication network can include base stations and user equipment of a wide variety of types and/or numbers.

For instance, in the example shown, the communication network 100 includes the macro cell base station 101 and the small cell base station 103. The small cell base station 103 can operate with relatively lower power, shorter range, and/or with fewer concurrent users relative to the macro cell base station 101. The small cell base station 103 can also be referred to as a femtocell, a picocell, or a microcell. Although the communication network 100 is illustrated as including two base stations, the communication network 100 can be implemented to include more or fewer base stations and/or base stations of other types.

Although various examples of user equipment are shown, the teachings herein are applicable to a wide variety of user equipment, including, but not limited to, mobile phones, tablets, laptops, Internet of Things (IoT) devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 100 of FIG. 1 supports communications using a variety of cellular technologies, including, for example, 4G LTE and 5G NR. In certain implementations, the communication network 100 is further adapted to provide a wireless local area network (WLAN), such as WiFi. Although various examples of communication technologies have been provided, the communication network 100 can be adapted to support a wide variety of communication technologies.

Various communication links of the communication network 100 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 100 can be implemented to support self-fronthaul and/or self-backhaul (for instance, as between mobile device 102g and mobile device 102f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a high power user equipment (HPUE) power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 100 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refer to technology for communication with very low latency, for instance, less than 2 milliseconds. uRLLC can be used for mission-critical communications such as for autonomous driving and/or remote surgery applications. Massive machine-type communications (mMTC) refer to low cost and low data rate communications associated with wireless connections to everyday objects, such as those associated with Internet of Things (IoT) applications.

The communication network 100 of FIG. 1 can be used to support a wide variety of advanced communication features, including, but not limited to, eMBB, uRLLC, and/or mMTC.

Figure 2A:
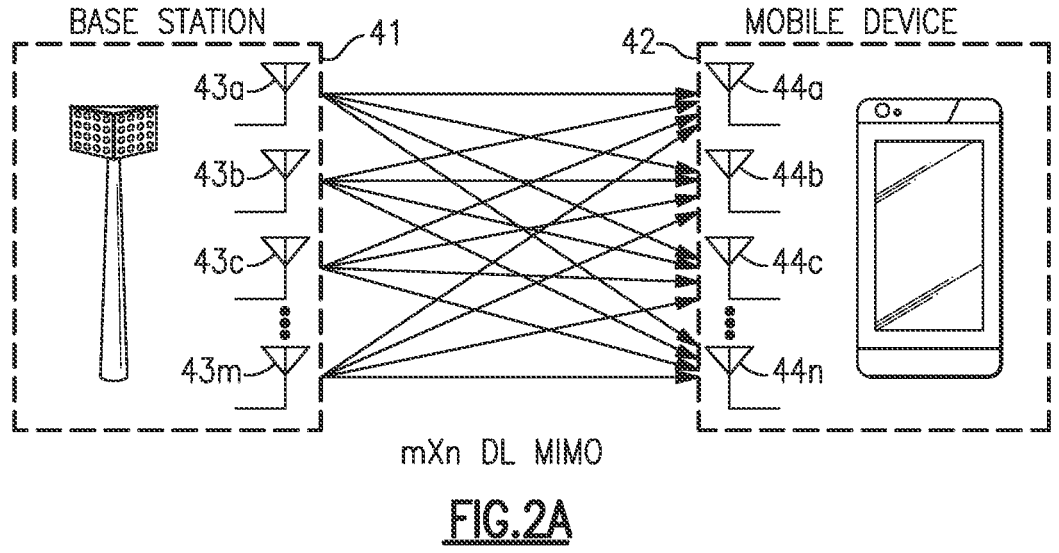
FIG. 2A is a schematic diagram of one example of a downlink channel using multi-input and multi-output (MIMO) communications.
Figure 2B:
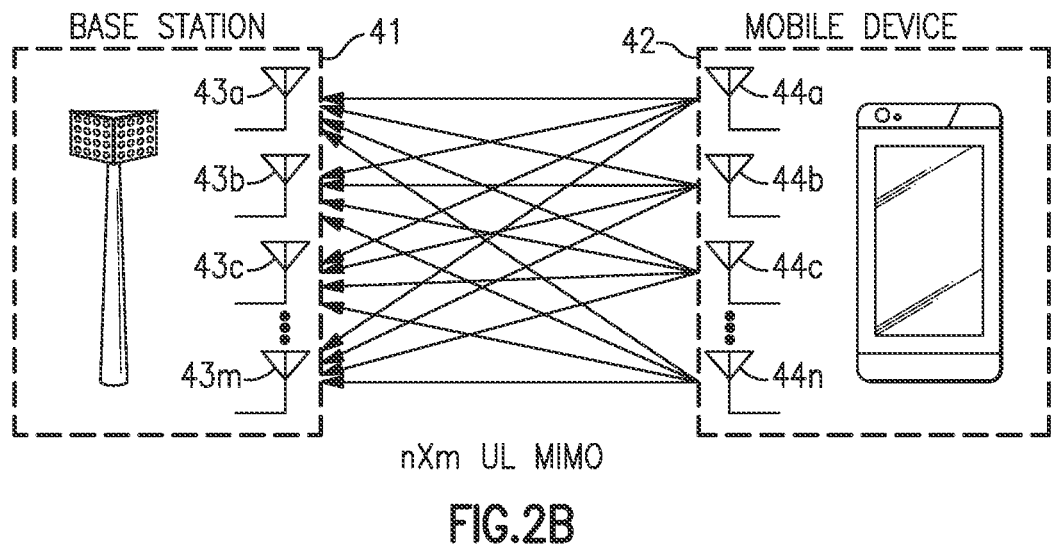
FIG. 2B is schematic diagram of one example of an uplink channel using MIMO communications.

FIG. 2A is a schematic diagram of one example of a downlink channel using multi-input and multi-output (MIMO) communications. FIG. 2B is schematic diagram of one example of an uplink channel using MIMO communications.

MIMO communications use multiple antennas for simultaneously communicating multiple data streams over a common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 2A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 4A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 2B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 2B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3:
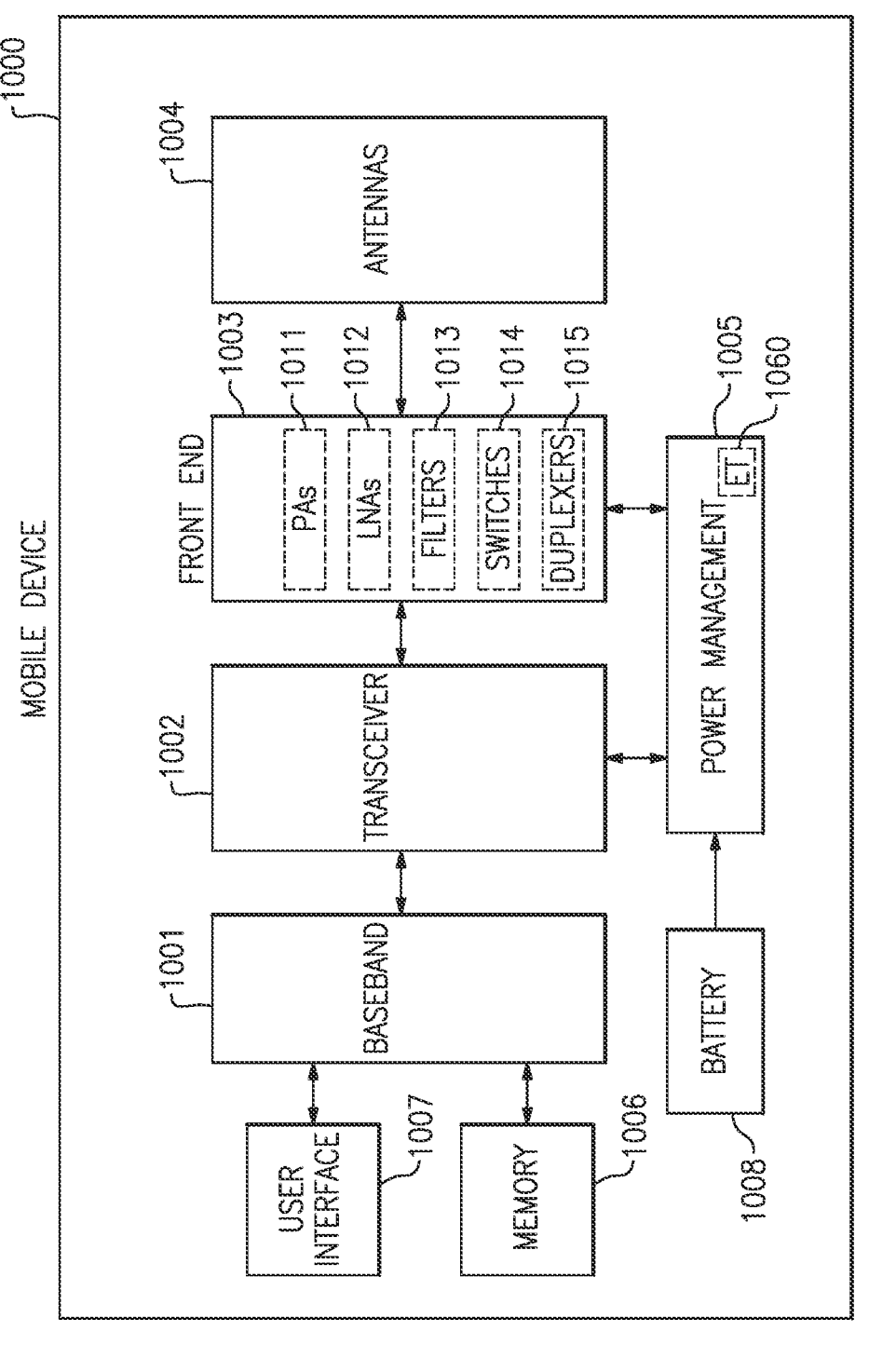
FIG. 3 is a schematic diagram of one embodiment of a mobile device.

FIG. 3 is a schematic diagram of one example of a mobile device 1000. The mobile device 1000 includes a baseband system 1001, a transceiver 1002, a front end system 1003, antennas 1004, a power management system 1005, a memory 1006, a user interface 1007, and a battery 1008.

The mobile device 1000 can be used communicate using a wide variety of communications technologies, including, but not limited to, 2G, 3G, 4G (including LTE, LTE-Advanced, and LTE-Advanced Pro), 5G, WLAN (for instance, Wi-Fi), WPAN (for instance, Bluetooth and Zig-Bee), WMAN (for instance, WiMax), and/or GPS technologies.

The transceiver 1002 generates RF signals for transmission and processes incoming RF signals received from the antennas 1004. It will be understood that various functionalities associated with the transmission and receiving of RF signals can be achieved by one or more components that are collectively represented in FIG. 3 as the transceiver 1002. In one example, separate components (for instance, separate circuits or dies) can be provided for handling certain types of RF signals.

The front end system 1003 aids in conditioning signals transmitted to and/or received from the antennas 1004. In the illustrated embodiment, the front end system 1003 includes power amplifiers (PAs) 1011, low noise amplifiers (LNAs) 1012, filters 1013, switches 1014, and duplexers 1015. However, other implementations are possible.

For example, the front end system 1003 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 1000 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band and/or in different bands.

The antennas 1004 can include antennas used for a wide variety of types of communications. For example, the antennas 1004 can include antennas associated transmitting and/or receiving signals associated with a wide variety of frequencies and communications standards.

In certain implementations, the antennas 1004 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 1000 can operate with beamforming in certain implementations. For example, the front end system 1003 can include phase shifters having variable phases controlled by the transceiver 1002. Additionally, the phase shifters may be controlled to provide beam formation and directivity for transmission and/or reception of signals using the antennas 1004. For example, in the context of signal transmission, the phases of the transmit signals provided to the antennas 1004 are controlled such that radiated signals from the antennas 1004 combine using constructive and destructive interference to generate an aggregate transmit signal exhibiting beam-like qualities with more signal strength propagating in a given direction. In the context of signal reception, the phases are controlled such that more signal energy is received when the signal is arriving to the antennas 1004 from a particular direction. In certain implementations, the antennas 1004 include one or more arrays of antenna elements to enhance beamforming.

The baseband system 1001 is coupled to the user interface 1007 to facilitate processing of various user input and output (I/O), such as voice and data. The baseband system 1001 provides the transceiver 1002 with digital representations of transmit signals, which the transceiver 1002 processes to generate RF signals for transmission. The baseband system 1001 also processes digital representations of received signals provided by the transceiver 1002. As shown in FIG. 3, the baseband system 1001 is coupled to the memory 1006 to facilitate operation of the mobile device 1000.

The memory 1006 can be used for a wide variety of purposes, such as storing data and/or instructions to facilitate the operation of the mobile device 1000 and/or to provide storage of user information.

The power management system 1005 provides a number of power management functions of the mobile device 1000. The power management system 1005 of FIG. 3 includes an envelope tracker 1060. As shown in FIG. 3, the power management system 1005 receives a battery voltage form the battery 1008. The battery 1008 can be any suitable battery for use in the mobile device 1000, including, for example, a lithium-ion battery.

The mobile device 1000 of FIG. 3 illustrates one example of an RF communication system that can include power amplifier(s) implemented in accordance with one or more features of the present disclosure. However, the teachings herein are applicable to RF communication systems implemented in a wide variety of ways.

Figure 4:
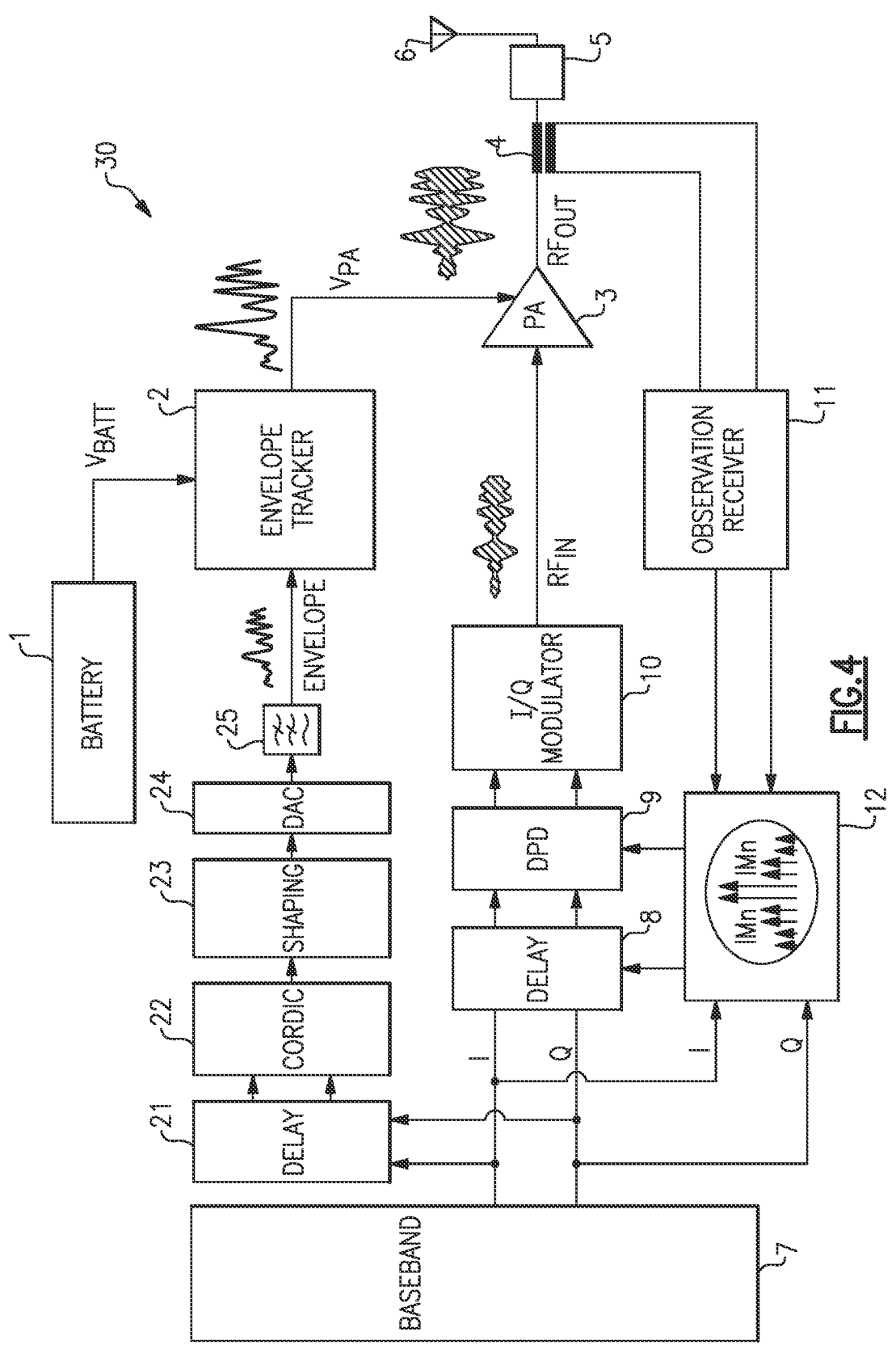
FIG. 4 is a schematic diagram of one embodiment of a transmit system for transmitting radio frequency (RF) signals from a mobile device.

FIG. 4 is a schematic diagram of one embodiment of a transmit system for transmitting RF signals from a mobile device. The transmit system 30 includes a battery 1, an envelope tracker 2, a power amplifier 3, a directional coupler 4, a duplexing and switching circuit 5, an antenna 6, a baseband processor 7, a signal delay circuit 8, a digital pre-distortion (DPD) circuit 9, an I/Q modulator 10, an observation receiver 11, an intermodulation detection circuit 12, an envelope delay circuit 21, a coordinate rotation digital computation (CORDIC) circuit 22, a shaping circuit 23, a digital-to-analog converter 24, and a reconstruction filter 25.

The transmit system 30 of FIG. 4 illustrates one example of an RF communication system that can include power amplifier(s) implemented in accordance with one or more features of the present disclosure. However, the teachings herein are applicable to RF communication systems implemented in a wide variety of ways.

The baseband processor 7 operates to generate an I signal and a Q signal, which correspond to signal components of a sinusoidal wave or signal of a desired amplitude, frequency, and phase. For example, the I signal can be used to represent an in-phase component of the sinusoidal wave and the Q signal can be used to represent a quadrature-phase component of the sinusoidal wave, which can be an equivalent representation of the sinusoidal wave. In certain implementations, the I and Q signals are provided to the UQ modulator 10 in a digital format. The baseband processor 7 can be any suitable processor configured to process a baseband signal. For instance, the baseband processor 7 can include a digital signal processor, a microprocessor, a programmable core, or any combination thereof.

The signal delay circuit 8 provides adjustable delay to the I and Q signals to aid in controlling relative alignment between the envelope signal and the RF signal $RF_{IN}$. The amount of delay provided by the signal delay circuit 8 is controlled based on amount of intermodulation detected by the intermodulation detection circuit 12.

The DPD circuit 9 operates to provide digital shaping to the delayed I and Q signals from the signal delay circuit 8 to generate digitally pre-distorted I and Q signals. In the illustrated embodiment, the DPD provided by the DPD circuit 9 is controlled based on amount of intermodulation detected by the intermodulation detection circuit 12. The DPD circuit 9 serves to reduce a distortion of the power amplifier 3 and/or to increase the efficiency of the power amplifier 3.

The I/Q modulator 10 receives the digitally pre-distorted I and Q signals, which are processed to generate an RF signal $RF_{IN}$. For example, the I/Q modulator 10 can include DAC s configured to convert the digitally pre-distorted I and Q signals into an analog format, mixers for upconverting the analog I and Q signals to radio frequency, and a signal combiner for combining the upconverted I and Q signals into an RF signal suitable for amplification by the power amplifier 3. In certain implementations, the I/Q modulator 10 can include one or more filters configured to filter frequency content of signals processed therein.

The envelope delay circuit 21 delays the I and Q signals from the baseband processor 7. Additionally, the CORDIC circuit 22 processes the delayed I and Q signals to generate a digital envelope signal representing an envelope of the RF signal $RF_{IN}$. Although FIG. 4 illustrates an implementation using the CORDIC circuit 22, an envelope signal can be obtained in other ways.

The shaping circuit 23 operates to shape the digital envelope signal to enhance the performance of the transmit system 30. In certain implementations, the shaping circuit 23 includes a shaping table that maps each level of the digital envelope signal to a corresponding shaped envelope signal level. Envelope shaping can aid in controlling linearity, distortion, and/or efficiency of the power amplifier 3.

In the illustrated embodiment, the shaped envelope signal is a digital signal that is converted by the DAC 24 to an analog envelope signal. Additionally, the analog envelope signal is filtered by the reconstruction filter 25 to generate an envelope signal suitable for use by the envelope tracker 2. In certain implementations, the reconstruction filter 25 includes a low pass filter.

With continuing reference to FIG. 4, the envelope tracker 2 receives the envelope signal from the reconstruction filter 25 and a battery voltage $V_{BATT}$ from the battery 1, and uses the envelope signal to generate a power amplifier supply voltage $V_{PA}$ for the power amplifier 3 that changes in relation to the envelope of the RF signal $RF_{IN}$. The power amplifier 3 receives the RF signal $RF_{IN}$ from the I/Q modulator 10, and provides an amplified RF signal $RF_{OUT}$ to the antenna 6 through the duplexing and switching circuit 5, in this example.

The directional coupler 4 is positioned between the output of the power amplifier 3 and the input of the duplexing and switching circuit 5, thereby allowing a measurement of output power of the power amplifier 3 that does not include insertion loss of the duplexing and switching circuit 5. The sensed output signal from the directional coupler 4 is provided to the observation receiver 11, which can include mixers for down converting I and Q signal components of the sensed output signal, and DACs for generating I and Q observation signals from the downconverted signals.

The intermodulation detection circuit 12 determines an intermodulation product between the I and Q observation signals and the I and Q signals from the baseband processor 7. Additionally, the intermodulation detection circuit 12 controls the DPD provided by the DPD circuit 9 and/or a delay of the signal delay circuit 8 to control relative alignment between the envelope signal and the RF signal $RF_{IN}$.

By including a feedback path from the output of the power amplifier 3 and baseband, the I and Q signals can be dynamically adjusted to optimize the operation of the transmit system 30. For example, configuring the transmit system 30 in this manner can aid in providing power control, compensating for transmitter impairments, and/or in performing DPD.

Although illustrated as a single stage, the power amplifier 3 can include one or more stages. Furthermore, RF communication systems such as mobile devices can include multiple power amplifiers. In such implementations, separate envelope trackers can be provided for different power amplifiers and/or one or more shared envelope trackers can be used.

In 5G NR (new radio) technology, bandwidth part (BWP) has been introduced. BWP is subset of contiguous RBs on a carrier. Up to four bandwidth parts, for example, can be configured in the UE for each of the UL and DL, but at a given time, only one bandwidth part is active per transmission direction (either UL or DL). However, the number of bandwidth parts configured in a single carrier is not limited thereto. For example, the number of bandwidth parts, which is also referred to as sub-bands in this description, may be 2 to 6.

Meanwhile, Listen-Before-Talk (LBT) protocol is a mechanism that allows Wi-Fi and LTE systems to share the unlicensed band while maintaining the performance of each individual system, i.e., Wi-Fi and LTE systems. LBT is a technique used in radio communications whereby a radio transmitter first senses its radio environment before it starts a transmission.

According to the conventional manner, for the NR-U (NR-unlicensed spectrum) wideband operation in 20 MHz sub-bands in a n×20 MHz Channel (n=2 to 6) but also in two CC in contiguous ULCA, LBT has been performed per sub-band with different rules for BS and UE.

For example, the base station (BS) can transmit in all idle sub-bands whether these are contiguous or non-contiguous. In this case, the baseband processor on the base station's side has to prepare all possible LBT scenarios in advance in memory and based on LBT result select the appropriate transmission configuration.

However, according to Releases 16 and 17 of 3GPP specification, the UE is scheduled with a number of 'contiguous' sub-bands, and if LBT is failed in any one of the scheduled sub-bands, there is no transmission. In other words, the UE has limited opportunity to perform uplink transmission according to the conventional LBT operation.

Therefore, it is desired to enable more opportunity for UE transmissions depending on LBT results at minimum complexity. On the other hand, not only for the UE but also for the BS, it is desirable to perform data transmission in a shorter time after sensing the carrier to increase reliability of the LBT operation.

According to embodiments of the present disclosure, there is provided a method for performing uplink/downlink transmission to improve efficiency of using the resource with enhanced reliability of LBT operation.

Figure 5:
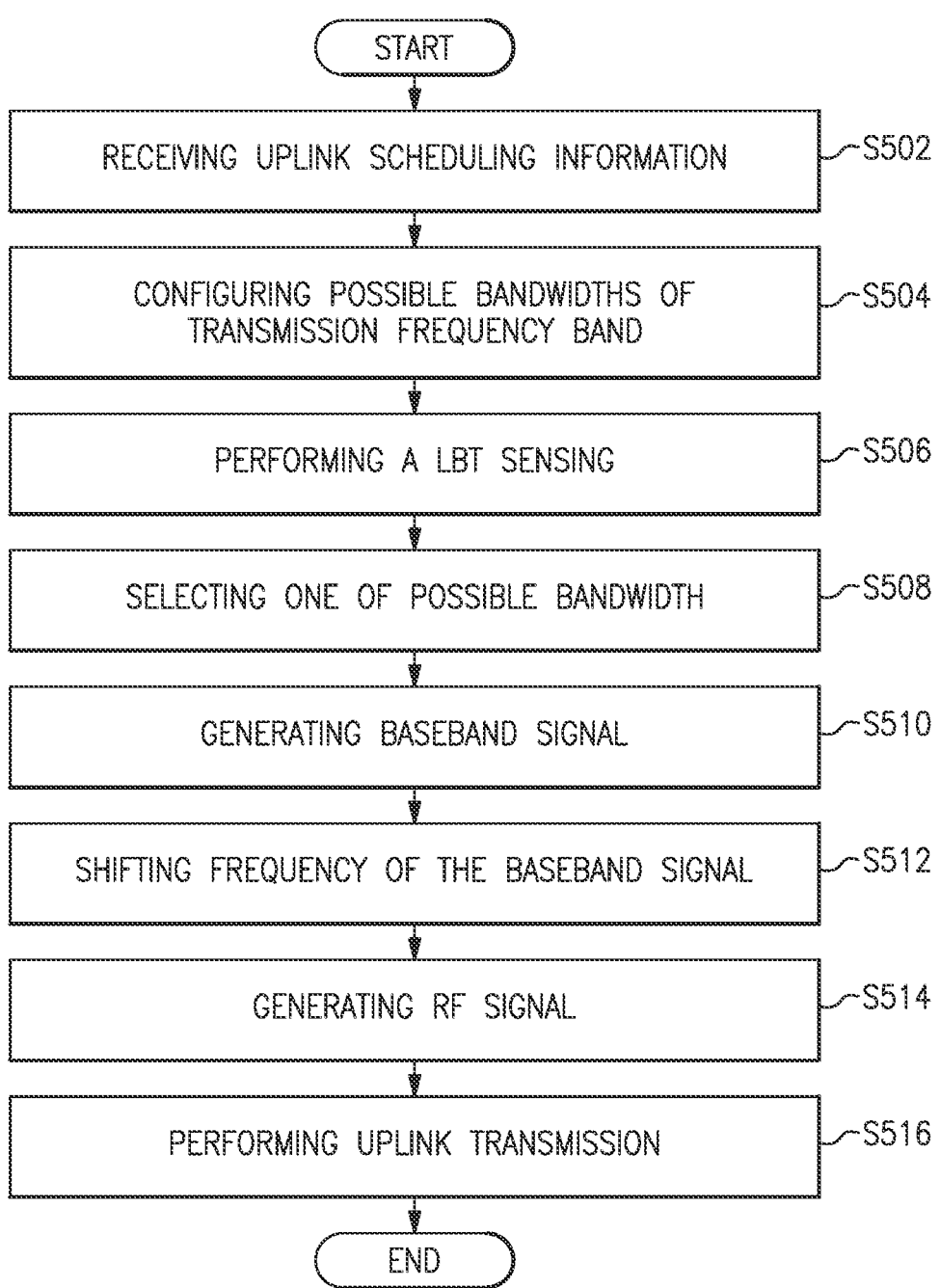
FIG. 5 is a flow chart illustrating the method for a user equipment (UE) configured to perform uplink transmission in an unlicensed band in a wireless communication system according to an embodiment of the present disclosure.

FIG. 5 is a flow chart illustrating the method for a user equipment (UE) configured to perform uplink transmission in an unlicensed band in a wireless communication system according to an embodiment of the present disclosure.

Embodiments of the present disclosure enable reduced complexity in preparing a reduced set of possible transmission configurations at a stage of processing a baseband signal, by adding hardware element(s) capable of fast frequency shifts of the reduced set. In contrast to the conventional manner, the embodiments of the present disclosure provide a particular transmission configuration that covers a plurality of transmission scenarios while using less memory and consuming less time.

In step S502, the UE is configured to receive uplink scheduling information from a base station (BS). The uplink scheduling information includes information of a plurality of sub-bands. The sub-bands may be bandwidth parts, and each of the sub-bands may be a subset of contiguous resource blocks on a carrier. For example, the uplink scheduling information may indicate 4 sub-bands that are contiguous, with each of the sub-bands having a bandwidth of 20 MHz. However, the number of sub-bands and the bandwidth of each sub-band are not limited thereto.

In step S504, the UE is configured to configure possible bandwidths of the transmission frequency band. The possible bandwidths of transmission frequency may be a group of bandwidths that are possible to be used in the uplink transmission. The possible bandwidths according to the embodiments will be described in more detail.

In step S506, the UE is configured to perform a carrier sensing on each of the plurality of sub-bands. The UE is capable of sensing each of the sub-bands, so as to determine which sub-band is idle. When a specific sub-band is idle, the UE can determine that the specific sub-band is not occupied by another communication node and is free for transmission. The UE can collect the information whether each of the sub-bands is idle or busy.

In step S508, the UE is configured to determine a transmission frequency band for the uplink transmission based on the carrier sensing. The transmission frequency band is a group of frequency bands that are determined to be used for data transmission. The UE is configured to select at least one sub-band among the plurality of sub-bands to perform the uplink transmission. Therefore, the transmission frequency band includes at least one sensed idle sub-band that is free for the transmission. According to an embodiment, the transmission frequency band may be identical to the sensed idle sub-bands, but the transmission frequency band may not be identical to all the sensed idle sub-bands. In addition, the transmission frequency band may be a group of contiguous sub-bands, but the transmission frequency band may include non-contiguous sub-bands.

The transmission frequency band may be one of plurality of pre-configured transmission frequency bands. That is, the UE is configured to select one transmission frequency band from a pre-configured pool based on the result of carrier sensing. Each of the plurality of pre-configured transmission frequency bands includes first information of a number of sub-bands included in respective transmission frequency band and second information of center frequency of the transmission frequency band deviated from a center frequency of the plurality of sub-bands. A number of different first information determines an amount of data required for UE to prepare. As will be described in more detail, the first information is related to a modulation process of the baseband signal, and the second information is related to an auxiliary frequency shift. As the number of first information gets lower, the memory of the UE used to prepare to perform LBT is reduced. In addition, the auxiliary frequency shift after modulation of the baseband signal is performed in advance of generation of the RF signal, so the time required to perform LBT is significantly saved, because the frequency shift can be done in shorter time.

The transmission frequency band may be selected among the plurality of pre-configured transmission frequency bands according to a selection rule.

For example, the transmission frequency band may be a largest number of contiguous sub-bands among the at least one idle sub-band. In this example, it is understood that there are more than two idle sub-bands detected as free for transmission. If it is determined that two contiguous sub-bands are idle and a non-contiguous sub-band is idle, then the UE may select the two contiguous sub-bands to be the transmission frequency band.

In another example, the transmission frequency band may be at least one sub-band having a lowest frequency range among the sensed idle sub-bands. If it is determined that one sub-band in a higher frequency range and another sub-band in a lower frequency range are idle, then the UE is configured to select the one with the lower frequency band to be the transmission frequency band.

In another example, the transmission frequency band may be at least one sub-band having a highest frequency range among the sensed idle sub-bands. If it is determined that one sub-band in a higher frequency range and another sub-band in a lower frequency range are idle, then the UE is configured to select the one with higher frequency band to be the transmission frequency band.

In the other example, the transmission frequency band may include all of the sensed idle sub-bands. In this example, the UE is configured to select all idle sub-bands including at least one busy sub-band that is not available for the transmission.

In step S510, the UE is configured to process a baseband (BB) signal according to a number of sub-bands included in the determined transmission frequency band. In this description the processing of the baseband signal may indicate modulation of the baseband signal. In other words, the UE is configured to modulate the baseband signal differently depending on the determined frequency band. However, the number of types of modulation processes is less than the actual number of scenarios that can happen, because some types of modulation processes of the baseband signal cover a multiple number of scenarios.

According to an embodiment, the types of modulation processes of the baseband signal can be determined based on the bandwidth of the transmission frequency band. In one example, the modulation of the baseband signal corresponding to the transmission frequency band of $1^{st}$ lowest one BWP (when result of carrier sensing for 4 sub-bands is 1000) is identical to the modulation of the baseband signal corresponding to the transmission frequency band of $3^{rd}$ lowest one BWP (when the result of carrier sensing for 4 sub-bands is 0010). In another example, the modulation of the baseband signal corresponding to the transmission frequency band of $1^{st}$ and $2^{nd}$ BWPs (when the result of carrier sensing for 4 sub-band is 1100) is identical to the modulation of the baseband signal corresponding to the transmission frequency band of $3^{rd}$ and $4^{th}$ BWPs (when the result of carrier sensing for 4 sub-band is 0011). Therefore, the modulation of the baseband signal is performed based on the bandwidth of the determined transmission frequency band to cover different scenarios with the same bandwidth and different location of the transmission frequency band. In this manner, the number of occasions that has to be prepared in the memory of the UE can be reduced, and therefore an increase in the efficiency of memory usage of the UE is achieved.

According to another embodiment, the baseband signal can be modulated further based on a sequence of the non-contiguous idle sub-bands and the at least one busy sub-band, when the transmission frequency band includes non-contiguous sub-bands and a busy sub-band therebetween. In other words, the types of modulation process of base band signal can be determined further based on the sequence of the non-contiguous idle sub-bands and at least one busy sub-band. In this case, the UE is configured to increase the output power of the RF signal to avoid emission issues occurring due to the busy sub-band located between the non-contiguous sub-bands.

The processed baseband signal may include in-phase (I) signal and quadrature (Q) signals of the baseband signal. In this disclosure, the processed baseband signal may be also referred to as the modulated baseband signal.

In step S512, the UE is configured to adjust the processed baseband signal by shifting the frequency of the processed baseband signal based on a center frequency of the transmission frequency band. In this step, the UE is configured to adjust the processed or modulated baseband signal based on the actual location of the transmission frequency band. More specifically, the processed baseband signal is shifted in frequency by a difference between a center frequency of the plurality of sub-bands and the center frequency of the transmission frequency band.

The processed baseband signal is shifted to a higher frequency range or a lower frequency range using a phase rotator including a plurality of multipliers (for example, 4 multipliers). The structure of the phase rotator that is configured to perform the frequency shift will be illustrated in FIG. 6. The direction (lower or higher direction) of the frequency shift can be controlled by swapping sinusoidal waves, e.g., sine wave and cosine waves by the phase rotator. The phase rotator can be implemented to be combined with the baseband processor, or to be a separate component.

By using a baseband rotator for the frequency shift of the processed baseband signal in advance to generation of RF signal, the time spent for LBT and uplink transmission can be significantly reduced, for example, to only a few microseconds, since the local oscillator (i.e., RF signal generator) might require much more time (more than tens of microseconds). Therefore, the reliability of LBT operation can be enhanced, because the subsequent data transmission would be done as soon as possible after carrier sensing is performed.

The baseband rotator is configured with a look-up-table (LUT) indicating the amount and direction of the frequency shift required in accordance with the determined transmission frequency band. The baseband rotator may receive a signal informing the information of the determined transmission frequency band, and perform the frequency shift accordingly using the LUT.

In step S514, the UE is configured to generate the radio frequency (RF) signal of the adjusted baseband signal. The UE generates the RF signal using a local oscillator. The local oscillator is configured to generate the RF signal without additional frequency tunings. Since the processed baseband signal is already adjusted by a frequency shift, the RF signal

16

Tables 1-5 show examples of scenarios for performing LBT with multiple BWPs (sub-bands) according to embodiments of the present disclosure.

In tables 1-5, the Capability 0 indicates a conventional LBT operation where no transmission is allowed unless all of the BWPs are free for transmission. As shown in Table 1, the capability 0 is an example of LBT operation according to the 3GPP specification. The transmission time interval (TTI) from Tables 1-5 indicates a respective type of modulation of baseband signal, since the TTI is determined based on the number of available sub-bands included in the transmission frequency band. Capabilities 1 and 1+ provide LBT operation where the transmission frequency band is determined to be at least one sub-band having a lowest frequency range among the sensed idle sub-bands. Capability 1 does not include frequency shift, whereas Capability 1+ according to an embodiment of the present disclosure is capable of frequency shift. Capabilities 2 and 2+ provide LBT operation where the transmission frequency band is determined to include all of the sensed idle sub-bands. In this case, the UE is configured to select all idle sub-bands including at least one busy sub-band that is not available for the transmission. Therefore, Capability 2+ has different selection rule for determining the transmission frequency band than Capability 1+. Capability 2 does not include frequency shift, whereas Capability 2+ according to an embodiment of the present disclosure is capable of frequency shift.

The carrier sensing result shows whether each sub-band is idle or busy. For example, '101' for the result of carrier sensing on 3 sub-bands indicates that the lowest and highest BWPs (sub-bands) are available, e.g., idle, and the middle sub-band is not available, e.g., busy.

The rules of Tables 1-5 indicate the selection rule for the transmission frequency band. HW in each table means a number of occasions with which the UE hardware has to be prepared.

Table 1 shows an example of scenarios for performing LBT with 2 BWPs according to an embodiment of the present disclosure.

TABLE 1

| capability | 0 | 1 | 1+ | 2 | 2+ |
|---|---|---|---|---|---|
| Rule | transmission only if no LBT failed | transmission only in lowest best contiguous BWP left after LBT | | transmission in all BWP left after LBT | |
| 3GPP | 3GPP R16 UE | new UE capability | | 3GPP BS + new UE capability | |
| BWP | contiguous | best contiguous | | contiguous and non-contiguous BWP | |
| BB F shift | no | no | yes | no | yes |
| LO IQ swap | no | yes | yes | no | yes |
| LBT | TTI | TTI | TTI | Shift(+/−) | TTI | TTI | Shift(+/−) |
| 00 | na | na | na | | na | Na | na |
| 01 | no | 01 BWP | 1 BWP | 0.5 BWP(+) | 01 BWP | 1 BWP | 0.5 BWP(+) |
| 10 | no | 10 BWP | 1 BWP | 0.5 BWP(−) | 10 BWP | 1 BWP | 0.5 BWP(−) |
| 11 | 11 BWP | 11 BWP | 11 BWP | no | 11 BWP | 11 BWP | no |
| UE HW | 1 | 3 | 2 | 1 | 3 | 2 | 1 | generated by the local oscillator has a center frequency set to a center of the transmission frequency band.

In step S516, the UE is configured to perform the uplink transmission for the generated RF signal to the BS.

It is understood that the method described in reference to the flow chart of FIG. 5 can also apply to the operation of the base station, as will be described in reference to the flow chart of FIG. 7.

As shown in Table 1, in Capability 1+, the number of occasions that the UE has to prepare is reduced because the type of modulation process for the baseband signal is the same for both 01 and 10 for the carrier sensing results. The difference is that the frequency is shifted toward higher frequency range (+) by 0.5 BWP in case of 01 for the carrier sensing result, whereas the frequency is shifted toward lower frequency range (−) by 0.5 BWP in case of 10, since the frequency is shifted to a center of the transmission frequency band (01 or 10) from the center frequency of all of the plurality of sub-bands (11).

Table 2 shows an example of scenarios for performing LBT with 3 BWPs according to an embodiment of the present disclosure.

TABLE 2

| Capability | 0 | 1 | | 1+ | 2 | | 2+ |
|---|---|---|---|---|---|---|---|
| rule | transmission only if no LBT failed | transmission only in lowest best contiguous BWP left after LBT | | | transmission in all BWP left after LBT | | |
| 3GPP BWP | 3GPP R16 UE contiguous | new UE capability best contiguous | | | 3GPP BS + new UE capability contiguous and non-contiguous BWP | | |
| BB F shift | no | no | | yes | no | | yes |
| LO IQ swap | no | yes | | yes | no | | yes |
| LBT | TTI | TTI | TTI | Shift(+/−) | TTI | TTI | Shift(+/−) |
| 000 | na | na | na | na | na | Na | na |
| 001 | no | 001 BWP | 1 BWP | 1 BWP(+) | 001 BWP | 1 BWP | 1 BWP(+) |
| 010 | no | 010 BWP | 1 BWP | no | 010 BWP | 1 BWP | no |
| 011 | no | 011 BWP | 11 BWP | 0.5 BWP(+) | 011 BWP | 11 BWP | 0.5 BWP(+) |
| 100 | no | 100 BWP | 1 BWP | 1 BWP(−) | 100 BWP | 1 BWP | 1 BWP(−) |
| 101 | na | 100 BWP | 1 BWP | 1 BWP(−) | 101 BWP | 101 BWP | no |
| 110 | no | 110 BWP | 11 BWP | 0.5 BWP(−) | 110 BWP | 11 BWP | 0.5 BWP(−) |
| 111 | 111 BWP | 111 BWP | 111 BWP | no | 111 BWP | 111 BWP | no |
| UE HW | 1 | 6 | 3 | 2 | 7 | 4 | 2 |

As shown in Table 2, according to capability 1+, both 001 and 010 for the result of carrier sensing have the same type of modulation of the baseband signal, because both cases have 1 BWP in the transmission frequency band. The number of occasions that the UE according to capability 1+ has to prepare or store is only 3.

In capability 1+, in response to 101 for the result of carrier sensing, the transmission frequency band is determined to be 1 BWP in a lower frequency range according to the selection rule. Whereas, in capability 2+, in response to 101 for the result of carrier sensing, the transmission frequency band is determined to be 101 BWP which includes all the idle sub-bands.

Table 3 shows an example of scenarios for performing LBT with 4 BWPs according to an embodiment of the present disclosure.

TABLE 3

| capability | 0 | 1 | | 1+ | 2 | | 2+ |
|---|---|---|---|---|---|---|---|
| rule | transmission only if no LBT failed | transmission only in lowest best contiguous BWP left after LBT | | | transmission in all BWP left after LBT | | |
| 3GPP BWP | 3GPP R16 UE contiguous | new UE capability best contiguous | | | 3GPP BS + new UE capability contiguous and non-contiguous BWP | | |
| BB F shift | no | no | | yes | no | | yes |
| LO IQ swap | no | yes | | yes | no | | yes |
| LBT | TTI | TTI | TTI | Shift(+/−) | TTI | TTI | Shift(+/−) |
| 0000 | na | na | na | na | na | Na | na |
| 0001 | no | 0001 BWP | 1 BWP | 1.5 BWP(+) | 0001 BWP | 1 BWP | 1.5 BWP(+) |
| 0010 | no | 0010 BWP | 1 BWP | 0.5 BWP(+) | 0010 BWP | 1 BWP | 0.5 BWP(+) |
| 0011 | no | 0011 BWP | 11 BWP | 1 BWP(+) | 0011 BWP | 11 BWP | 1 BWP(+) |
| 0100 | no | 0100 BWP | 1 BWP | 0.5 BWP(−) | 0100 BWP | 1 BWP | 0.5 BWP(−) |
| 0101 | na | 0100 BWP | 1 BWP | 0.5 BWP(−) | 0101 BWP | 101 BWP | 0.5 BWP(+) |
| 0110 | no | 0110 BWP | 11 BWP | no | 0110 BWP | 11 BWP | no |
| 0111 | no | 0111 BWP | 111 BWP | 0.5 BWP(+) | 0111 BWP | 111 BWP | 0.5 BWP(+) |
| 1000 | no | 1000 BWP | 1 BWP | 1.5 BWP(−) | 1000 BWP | 1 BWP | 1.5 BWP(−) |
| 1001 | na | 1000 BWP | 1 BWP | 1.5 BWP(−) | 1001 BWP | 1001 BWP | no |
| 1010 | na | 1000 BWP | 1 BWP | 1.5 BWP(−) | 1010 BWP | 101 BWP | 1.5 BWP(−) |
| 1011 | na | 0011 BWP | 11 BWP | 1 BWP(+) | 1011 BWP | 1011 BWP | no |
| 1100 | no | 1100 BWP | 11 BWP | 1 BWP(−) | 1100 BWP | 11 BWP | 1 BWP(−) |
| 1101 | na | 1100 BWP | 11 BWP | 1 BWP(−) | 1101 BWP | 1101 BWP | no |
| 1110 | no | 1110 BWP | 111 BWP | 0.5 BWP(−) | 1110 BWP | 111 BWP | 0.5 BWP(−) |
| 1111 | 1111 BWP | 1111 BWP | 1111 BWP | no | 1111 BWP | 1111 BWP | no |
| UE HW | 1 | 10 | 4 | 3 | 15 | 8 | 3 |

Table 4 shows an example of scenarios for performing LBT with 5 BWPs according to an embodiment of the present disclosure.

TABLE 4

| capability | 0 | 1 | 1+ | | 2 | 2+ | |
|---|---|---|---|---|---|---|---|
| rule | transmission only if no LBT failed | transmission only in lowest best contiguous BWP left after LBT | | | transmission in all BWP left after LBT | | |
| 3GPP BWP | 3GPP R16 UE contiguous | new UE capability best contiguous | | | 3GPP BS + new UE capability contiguous and non-contiguous BWP | | |
| BB F shift | no | no | yes | | no | yes | |
| LO IQ swap | no | yes | yes | | no | yes | |
| LBT | TTI | TTI | TTI | Shift(+/−) | TTI | TTI | Shift(+/−) |
| 00000 | na | na | na | na | na | Na | na |
| 00001 | no | 00001 BWP | 1 BWP | 2 BWP(+) | 00001 BWP | 1 BWP | 2 BWP(+) |
| 00010 | no | 00010 BWP | 1 BWP | 1 BWP(+) | 00010 BWP | 1 BWP | 1 BWP(+) |
| 00011 | no | 00011 BWP | 11 BWP | 1.5 BWP(+) | 00011 BWP | 11 BWP | 1.5 BWP(+) |
| 00100 | no | 00100 BWP | 1 BWP | no | 00100 BWP | 1 BWP | no |
| 00101 | na | 00100 BWP | 1 BWP | no | 00101 BWP | 101 BWP | 1 BWP(+) |
| 00110 | no | 00110 BWP | 11 BWP | 0.5 BWP(+) | 00110 BWP | 11 BWP | 0.5 BWP(+) |
| 00111 | no | 00111 BWP | 111 BWP | 1 BWP(+) | 00111 BWP | 111 BWP | 1 BWP(+) |
| 01000 | no | 01000 BWP | 1 BWP | 1 BWP(−) | 01000 BWP | 1 BWP | 1 BWP(−) |
| 01001 | na | 01000 BWP | 1 BWP | 1 BWP(−) | 01001 BWP | 1001 BWP | 0.5 BWP(+) |
| 01010 | na | 01000 BWP | 1 BWP | 1 BWP(−) | 01010 BWP | 101 BWP | no |
| 01011 | Na | 00011 BWP | 11 BWP | 1.5 BWP(+) | 01011 BWP | 1011 BWP | 0.5 BWP(+) |
| 01100 | no | 01100 BWP | 11 BWP | 0.5 BWP(−) | 01100 BWP | 11 BWP | 0.5 BWP(−) |
| 01101 | na | 01100 BWP | 11 BWP | 0.5 BWP(−) | 01101 BWP | 1101 BWP | 0.5 BWP(+) |
| 01110 | no | 01110 BWP | 111 BWP | no | 01110 BWP | 111 BWP | no |
| 01111 | no | 01111 BWP | 1111 BWP | 0.5 BWP(+) | 01111 BWP | 1111 BWP | 0.5 BWP(+) |
| 10000 | no | 10000 BWP | 1 BWP | 2 BWP(−) | 10000 BWP | 1 BWP | 2 BWP(−) |
| 10001 | na | 10000 BWP | 1 BWP | 2 BWP(−) | 10001 BWP | 10001 BWP | no |
| 10010 | na | 10000 BWP | 1 BWP | 2 BWP(−) | 10010 BWP | 1001 BWP | 0.5 BWP(−) |
| 10011 | na | 00011 BWP | 11 BWP | 1.5 BWP(+) | 10011 BWP | 10011 BWP | no |
| 10100 | na | 10000 BWP | 1 BWP | 2 BWP(−) | 10100 BWP | 101 BWP | 1 BWP(−) |
| 10101 | na | 10000 BWP | 1 BWP | 2 BWP(−) | 10101 BWP | 10101 BWP | no |
| 10110 | na | 00110 BWP | 11 BWP | 0.5 BWP(+) | 10110 BWP | 1011 BWP | 0.5 BWP(−) |
| 10111 | na | 00111 BWP | 111 BWP | 1 BWP(+) | 10111 BWP | 10111 BWP | no |
| 11000 | no | 11000 BWP | 11 BWP | 1.5 BWP(−) | 11000 BWP | 11 BWP | 1.5 BWP(−) |
| 11001 | na | 11000 BWP | 11 BWP | 1.5 BWP(−) | 11001 BWP | 11001 BWP | no |
| 11010 | na | 11000 BWP | 11 BWP | 1.5 BWP(−) | 11010 BWP | 1101 BWP | 0.5 BWP(−) |
| 11011 | na | 11000 BWP | 11 BWP | 1.5 BWP(−) | 11011 BWP | 11011 BWP | no |
| 11100 | no | 11100 BWP | 111 BWP | 1 BWP(−) | 11100 BWP | 111 BWP | 1 BWP(−) |
| 11101 | na | 11100 BWP | 111 BWP | 1 BWP(−) | 11101 BWP | 11101 BWP | no |

TABLE 4-continued

| capability | 0 | 1 | | 1+ | 2 | | 2+ |
|---|---|---|---|---|---|---|---|
| 11110 | no | 11110 BWP | 1111 BWP | 0.5 BWP(−) | 11110 BWP | 1111 BWP | 0.5 BWP(−) |
| 11111 | 11111 BWP | 11111 BWP | 11111 BWP | no | 11111 BWP | 11111 BWP | no |
| UE HW | 1 | 15 | 5 | 4 | 31 | 16 | 4 |

Table 5 shows an example of scenarios for performing LBT with 6 BWPs according to an embodiment of the present disclosure.

TABLE 5

| capability | 0 | 1 | | 1+ | 2 | | 2+ |
|---|---|---|---|---|---|---|---|
| rule | transmission only if no LBT failed | transmission only in lowest best contiguous BWP left after LBT | | | transmission in all BWP left after LBT | | |
| 3GPP | 3GPP R16 UE | new UE capability | | | 3GPP BS + new UE capability | | |
| BWP | contiguous | best contiguous | | | contiguous and non-contiguous BWP | | |
| BB F shift | no | no | | yes | no | | yes |
| LO IQ swap | no | yes | | yes | no | | yes |
| LBT | TTI | TTI | TTI | Shift(+/−) | TTI | TTI | Shift(+/−) |
| 000000 | na | na | na | na | na | Na | na |
| 000001 | no | 000001 BWP | 1 BWP | 2.5 BWP(+) | 000001 BWP | 1 BWP | 2.5 BWP(+) |
| 000010 | no | 000010 BWP | 1 BWP | 1.5 BWP(+) | 000010 BWP | 1 BWP | 1.5 BWP(+) |
| 000011 | no | 000011 BWP | 11 BWP | 2 BWP(+) | 000011 BWP | 11 BWP | 2 BWP(+) |
| 000100 | no | 000100 BWP | 1 BWP | 0.5 BWP(+) | 000100 BWP | 1 BWP | 0.5 BWP(+) |
| 000101 | na | 000100 BWP | 1 BWP | 0.5 BWP(+) | 000101 BWP | 101 BWP | 1.5 BWP(+) |
| 000110 | no | 000110 BWP | 11 BWP | 1 BWP(+) | 000110 BWP | 11 BWP | 1 BWP(+) |
| 000111 | no | 000111 BWP | 111 BWP | 1.5 BWP(+) | 000111 BWP | 111 BWP | 1.5 BWP(+) |
| 001000 | no | 001000 BWP | 1 BWP | 0.5 BWP(−) | 001000 BWP | 1 BWP | 0.5 BWP(−) |
| 001001 | na | 001000 BWP | 1 BWP | 0.5 BWP(−) | 001001 BWP | 1001 BWP | 1 BWP(+) |
| 001010 | na | 001000 BWP | 1 BWP | 0.5 BWP(−) | 001010 BWP | 101 BWP | 0.5 BWP(+) |
| 001011 | na | 000011 BWP | 11 BWP | 2 BWP(+) | 001011 BWP | 1011 BWP | 1 BWP(+) |
| 001100 | no | 001100 BWP | 11 BWP | no | 001100 BWP | 11 BWP | no |
| 001101 | na | 001100 BWP | 11 BWP | no | 001101 BWP | 1101 BWP | 1 BWP(+) |
| 001110 | no | 001110 BWP | 111 BWP | 0.5 BWP(+) | 001110 BWP | 111 BWP | 0.5 BWP(+) |
| 001111 | no | 001111 BWP | 1111 BWP | 1 BWP(+) | 001111 BWP | 1111 BWP | 1 BWP(+) |
| 010000 | no | 010000 BWP | 1 BWP | 1.5 BWP(−) | 010000 BWP | 1 BWP | 1.5 BWP(−) |
| 010001 | na | 010000 BWP | 1 BWP | 1.5 BWP(−) | 010001 BWP | 10001 BWP | 0.5 BWP(+) |
| 010010 | na | 010000 BWP | 1 BWP | 1.5 BWP(−) | 010010 BWP | 1001 BWP | no |
| 010011 | na | 000011 BWP | 11 BWP | 2 BWP(+) | 010011 BWP | 10011 BWP | 0.5 BWP(+) |
| 010100 | na | 010000 BWP | 1 BWP | 1.5 BWP(−) | 010100 BWP | 101 BWP | 0.5 BWP(−) |
| 010101 | na | 010000 BWP | 1 BWP | 1.5 BWP(−) | 010101 BWP | 10101 BWP | 0.5 BWP(+) |
| 010110 | na | 000110 BWP | 11 BWP | 1 BWP(+) | 010110 BWP | 1011 BWP | no |
| 010111 | na | 000111 BWP | 111 BWP | 1.5 BWP(+) | 010111 BWP | 10111 BWP | 0.5 BWP(+) |
| 011000 | no | 011000 BWP | 11 BWP | 1 BWP(−) | 011000 BWP | 11 BWP | 1 BWP(−) |

TABLE 5-continued

| capability | 0 | 1 | | 1+ | | 2 | | 2+ | |
|---|---|---|---|---|---|---|---|---|---|
| 011001 | na | 011000 BWP | 11 BWP | 1 | BWP(−) | 011001 BWP | 11001 BWP | 0.5 | BWP(+) |
| 011010 | na | 011000 BWP | 11 BWP | 1 | BWP(−) | 011010 BWP | 1101 BWP | no | |
| 011011 | na | 011000 BWP | 11 BWP | 1 | BWP(−) | 011011 BWP | 11011 BWP | 0.5 | BWP(+) |
| 011100 | no | 011100 BWP | 111 BWP | 0.5 | BWP(−) | 011100 BWP | 111 BWP | 0.5 | BWP(−) |
| 011101 | na | 011100 BWP | 111 BWP | 0.5 | BWP(−) | 011101 BWP | 11101 BWP | 0.5 | BWP(+) |
| 011110 | no | 011110 BWP | 1111 BWP | no | | 011110 BWP | 1111 BWP | no | |
| 011111 | no | 011111 BWP | 11111 BWP | 0.5 | BWP(+) | 011111 BWP | 11111 BWP | 0.5 | BWP(+) |
| 100000 | no | 100000 BWP | 1 BWP | 2.5 | BWP(−) | 100000 BWP | 1 BWP | 2.5 | BWP(−) |
| 100001 | na | 100000 BWP | 1 BWP | 2.5 | BWP(−) | 100001 BWP | 100001 BWP | no | |
| 100010 | na | 100000 BWP | 1 BWP | 2.5 | BWP(−) | 100010 BWP | 10001 BWP | 0.5 | BWP(−) |
| 100011 | na | 000011 BWP | 11 BWP | 2 | BWP(+) | 100011 BWP | 100011 BWP | no | |
| 100100 | na | 100000 BWP | 1 BWP | 2.5 | BWP(−) | 100100 BWP | 1001 BWP | 1 | BWP(−) |
| 100101 | na | 100000 BWP | 1 BWP | 2.5 | BWP(−) | 100101 BWP | 100101 BWP | no | |
| 100110 | na | 000110 BWP | 11 BWP | 1 | BWP(+) | 100110 BWP | 10011 BWP | 0.5 | BWP(−) |
| 100111 | na | 000111 BWP | 111 BWP | 1.5 | BWP(+) | 100111 BWP | 100111 BWP | no | |
| 101000 | na | 100000 BWP | 1 BWP | 2.5 | BWP(−) | 101000 BWP | 101 BWP | 1.5 | BWP(−) |
| 101001 | na | 100000 BWP | 1 BWP | 2.5 | BWP(−) | 101001 BWP | 101001 BWP | no | |
| 101010 | na | 100000 BWP | 1 BWP | 2.5 | BWP(−) | 101010 BWP | 10101 BWP | 0.5 | BWP(−) |
| 101011 | na | 000011 BWP | 11 BWP | 2 | BWP(+) | 101011 BWP | 101011 BWP | no | |
| 101100 | na | 001100 BWP | 11 BWP | no | | 101100 BWP | 1011 BWP | 1 | BWP(−) |
| 101101 | na | 001100 BWP | 11 BWP | no | | 101101 BWP | 101101 BWP | no | |
| 101110 | na | 001110 BWP | 111 BWP | 0.5 | BWP(+) | 101110 BWP | 10111 BWP | 0.5 | BWP(−) |
| 101111 | na | 001111 BWP | 1111 BWP | 1 | BWP(+) | 101111 BWP | 101111 BWP | no | |
| 110000 | no | 110000 BWP | 11 BWP | 2 | BWP(−) | 110000 BWP | 11 BWP | 2 | BWP(−) |
| 110001 | na | 110000 BWP | 11 BWP | 2 | BWP(−) | 110001 BWP | 110001 BWP | no | |
| 110010 | na | 110000 BWP | 11 BWP | 2 | BWP(−) | 110010 BWP | 11001 BWP | 0.5 | BWP(−) |
| 110011 | na | 110000 BWP | 11 BWP | 2 | BWP(−) | 110011 BWP | 110011 BWP | no | |
| 110100 | na | 110000 BWP | 11 BWP | 2 | BWP(−) | 110100 BWP | 1101 BWP | 1 | BWP(−) |
| 110101 | na | 110000 BWP | 11 BWP | 2 | BWP(−) | 110101 BWP | 110101 BWP | no | |
| 110110 | na | 110000 BWP | 11 BWP | 2 | BWP(−) | 110110 BWP | 11011 BWP | 0.5 | BWP(−) |
| 110111 | na | 000111 BWP | 111 BWP | 1.5 | BWP(+) | 110111 BWP | 110111 BWP | no | |
| 111000 | no | 111000 BWP | 111 BWP | 1.5 | BWP(−) | 111000 BWP | 111 BWP | 1.5 | BWP(−) |
| 111001 | na | 111000 BWP | 111 BWP | 1.5 | BWP(−) | 111001 BWP | 111001 BWP | no | |
| 111010 | na | 111000 BWP | 111 BWP | 1.5 | BWP(−) | 111010 BWP | 11101 BWP | 0.5 | BWP(−) |
| 111011 | na | 111000 BWP | 111 BWP | 1.5 | BWP(−) | 111011 BWP | 111011 BWP | no | |
| 111100 | no | 111100 BWP | 1111 BWP | 1 | BWP(−) | 111100 BWP | 1111 BWP | 1 | BWP(−) |
| 111101 | na | 111100 BWP | 1111 BWP | 1 | BWP(−) | 111101 BWP | 111101 BWP | no | |

TABLE 5-continued

| capability | 0 | 1 | 1+ | | 2 | 2+ | |
|---|---|---|---|---|---|---|---|
| 111110 | no | 111110 BWP | 11111 BWP | 0.5 BWP(−) | 111110 BWP | 11111 BWP | 0.5 BWP(−) |
| 111111 | no | 111111 BWP | 111111 BWP | no | 111111 BWP | 111111 BWP | no |
| UE HW | 1 | 2 | 6 | 5 | 63 | 32 | 5 |

Table 6 shows an example of complexity of each scenario according to embodiments of the present disclosure.

TABLE 6

| | | BWP | | | | | | | | | |
|---|---|---|---|---|---|---|---|---|---|---|---|
| | | 20 to 100 MHz CBW | | | | na | | | | | |
| | | 2CC contiguous ULCA | | | | | | | | | |
| | case | 2 | 3 | 4 | 5 | 6 | 7 | 8 | 9 | 10 | equation |
| TTIs | 0 | 1 | 1 | 1 | 1 | 1 | 1 | 1 | 1 | 1 | 1 |
| | 1 | 3 | 6 | 10 | 15 | 21 | 28 | 36 | 45 | 55 | $=(BWP + 1)*BWP/2$ |
| | 1+ | 2 | 3 | 4 | 5 | 6 | 7 | 8 | 9 | 10 | $=BWP$ |
| | 2 | 3 | 7 | 15 | 31 | 63 | 127 | 255 | 511 | 1023 | $=2^{BWP} - 1$ |
| | 2+ | 2 | 4 | 8 | 16 | 32 | 64 | 128 | 256 | 512 | $=2^{(BWP - 1)}$ |
| Shifts | 0 | 0 | 0 | 0 | 0 | 0 | 0 | 0 | 0 | 0 | no shift |
| | 1 | 0 | 0 | 0 | 0 | 0 | 0 | 0 | 0 | 0 | no shift |
| | 1+ | 1 | 2 | 3 | 4 | 5 | 6 | 7 | 8 | 9 | $=BWP - 1$ |
| | 2 | 0 | 0 | 0 | 0 | 0 | 0 | 0 | 0 | 0 | no shift |
| | 2+ | 1 | 2 | 3 | 4 | 5 | 6 | 7 | 8 | 9 | $=BWP - 1$ |
| complexity1 TTI(x5) + 1LUT/shift + mult | 0 | 5 | 5 | 5 | 5 | 5 | 5 | 5 | 5 | 5 | 5*nbTTI |
| | 1 | 15 | 30 | 50 | 75 | 105 | 140 | 180 | 225 | 275 | 5*nbTTI |
| | 1+ | 12 | 18 | 24 | 30 | 36 | 42 | 48 | 54 | 60 | 5*nbTTI + nbShift + 1 |
| | 2 | 15 | 35 | 75 | 155 | 315 | 635 | 1275 | 2555 | 5115 | 5*nbTTI |
| | 2+ | 12 | 23 | 44 | 85 | 166 | 327 | 648 | 1289 | 2570 | 5*nbTTI + nbShift + 1 |
| complexity2 TTI(x5) + 1LUT + mult | 1+ | 12 | 17 | 22 | 27 | 32 | 37 | 42 | 47 | 52 | 5*nbTTI + 2 |
| | 2+ | 12 | 22 | 42 | 82 | 162 | 322 | 642 | 1282 | 2562 | |
| complexity increase vs current UE | 1+ vs0 | 2, 4 | 3, 4 | 4, 4 | 5, 4 | 6, 4 | 7, 4 | 8, 4 | 9, 4 | 10, 4 | ~BWP |
| | 2+ vs0 | 2, 4 | 4, 4 | 8, 4 | 16, 4 | 32, 4 | 64, 4 | 128, 4 | 256, 4 | 512, 4 | $\sim 2^{(BWP - 1)}$ |
| complexity reduction | 1+ vs1 | 1, 3 | 1, 76 | 2, 27 | 2, 78 | 3, 281 | 3, 784 | 4, 286 | 4, 7872 | 5, 2885 | ~BWP/2 |
| | 2+ vs2 | 1, 3 | 1, 59 | 1, 79 | 1, 89 | 1, 944 | 1, 972 | 1, 986 | 1, 993 | 1, 9965 | tends to 2 |

As shown in Table 6, the number of transmission configurations, which is represented as TTIs, for the capability 1+ is significantly reduced compared to the capability 1.

Figure 6:
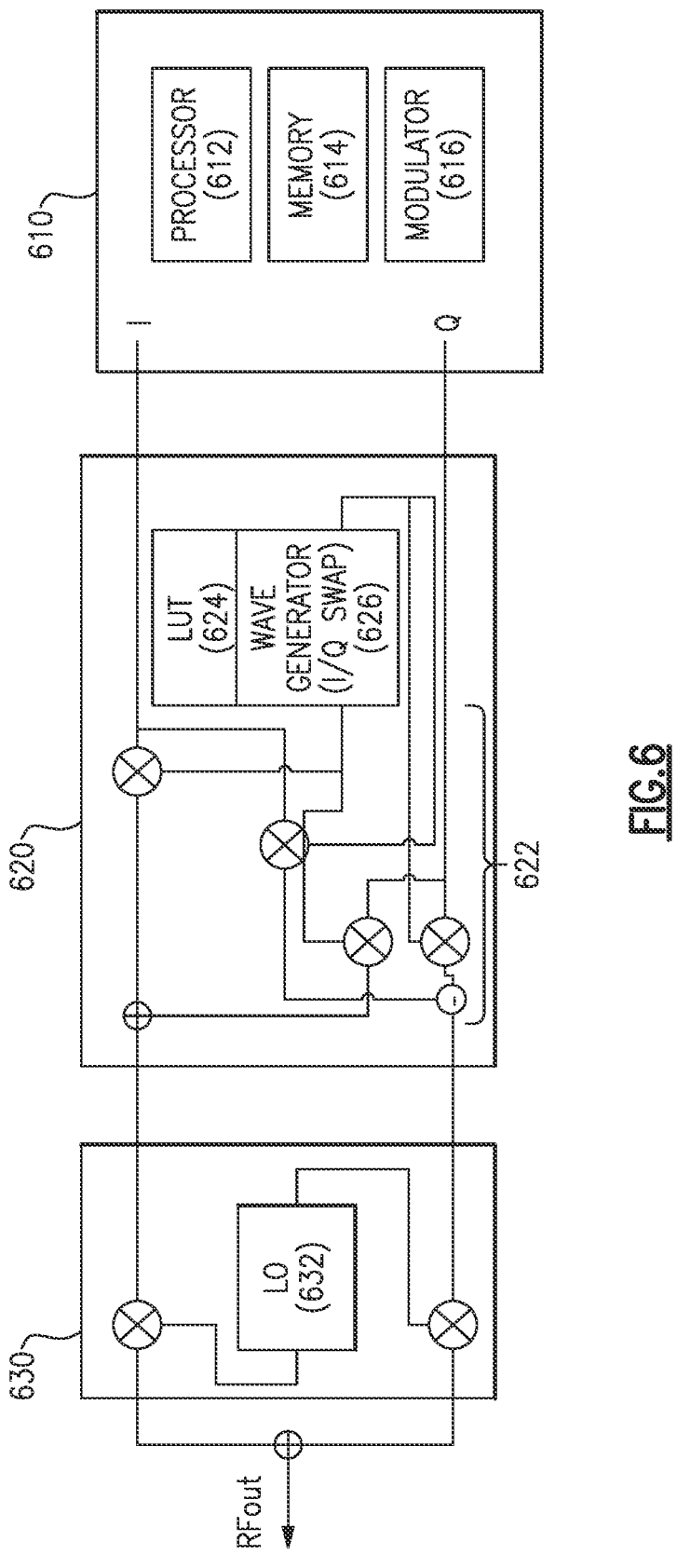
FIG. 6 is an example of diagram of a hardware structure for performing listen before talk (LBT) operation according to an embodiment of the present disclosure.

FIG. 6 is an example diagram of a hardware structure for performing an LBT operation according to an embodiment of the present disclosure. The hardware structure may be a baseband processor and a transceiver. The hardware structure may be used for the base station or user equipment. As shown in FIG. 6, the structure includes a baseband processor 610, a baseband rotator 620, and an RF generator 630.

The baseband processor 610 is configured to generate I/Q signals for a baseband signal. The baseband processor 610 includes processor 612, memory 614, and a modulator 616. The baseband processor 610 may have identical functions as the baseband processor 7 described with regard to FIG. 4. The memory 614 may store pre-configured capability of the LBT operation. That is, the configurations on selection rules for the transmission frequency band and on the information of frequency shift in each situation, e.g., result of carrier sensing, can be stored in the memory 614. The modulator 616 is configured to operate so as to generate the I/Q signals of the baseband.

The baseband rotator 620 is configured to perform a frequency shift on the generated I/Q signals. The baseband rotator 620 includes a plurality of multipliers 622, a look-up table (LUT) 624, and a sinusoidal wave generator 626. The LUT 624 may store information indicating the amount and direction of the frequency shift required in accordance with the determined transmission frequency band. The sinusoidal wave generator 626 is configured to generate signals to be multiplied with the I/Q signals. The sinusoidal wave generator 626 is configured to receive a signal informing the determined transmission frequency band, and to perform the frequency shift accordingly using the LUT 624. The LUT 624 per shifting frequency offers full flexibility in shifting frequency, which might be needed for interlaces and ULCA. Furthermore, a single LUT 624 with variable sampling rate in modulation of baseband signal can be further made generic with any frequency shift oversampling and fractional sampling rate, and it leads to lower complexity and it can work at the IQ sampling rate.

According to an embodiment of the present disclosure, the shifting direction of the frequency can be controlled by the sinusoidal wave generator 626 that is configured to swap the sin/cos waves to be multiplied with the I/Q signals.

The RF generator 630 is configured to generate an RF signal for the adjusted I/Q signal. The RF generator 630 includes local oscillator 632. The generated RF signal has a center frequency which is already shifted to the center frequency of the whole BWPs.

Figure 7:
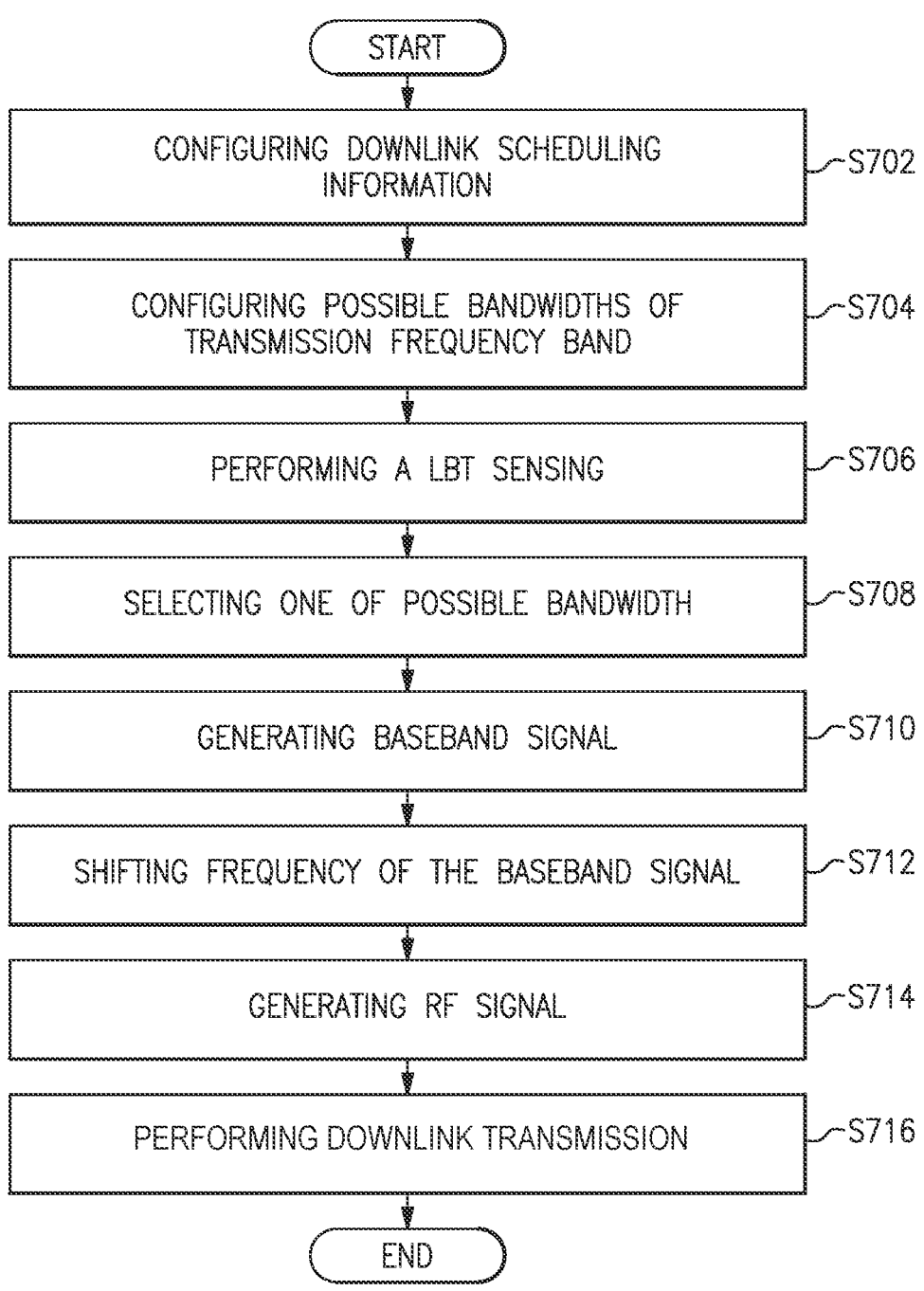
FIG. 7 is a flow chart illustrating the method for a base station (BS) configured to perform downlink transmission in an unlicensed band in a wireless communication system according to an embodiment of the present disclosure.

FIG. 7 is a flow chart illustrating the method for a base station (BS) configured to perform downlink transmission in an unlicensed band in a wireless communication system according to an embodiment of the present disclosure.

The method performed by the BS according to an embodiment of the present disclosure may be identical to the method for UE, except for that the resource scheduling information is configured by the base station and does not need to be sent to the UE. Therefore, the method steps of UE described in FIG. 5 can be also applied to the method steps for the BS.

In step S702, the BS is configured to configure downlink scheduling information of a plurality of sub-bands.

In step S704, the BS is configured to configure possible bandwidths of transmission frequency band.

In step S706, the BS is configured to perform carrier sensing on each of the plurality of sub-bands.

In step S708, the BS is configured to determine a transmission frequency band for the downlink transmission based on the carrier sensing, the transmission frequency band including at least one idle sub-band among the plurality of sub-bands that is free for transmission.

In step S710, the BS is configured to process a baseband signal according to a number of sub-bands included in the determined transmission frequency band.

In step S712, the BS is configured to adjust the processed baseband signal by shifting the frequency of the processed baseband signal based on a center frequency of the transmission frequency band.

In step S714, the BS is configured to generate a radio frequency (RF) signal of the adjusted baseband signal, the RF signal having a center frequency set to a center of the transmission frequency band.

In step S716, the BS is configured to perform the downlink transmission for the generated RF signal to a user equipment (UE).

Figure 8A:
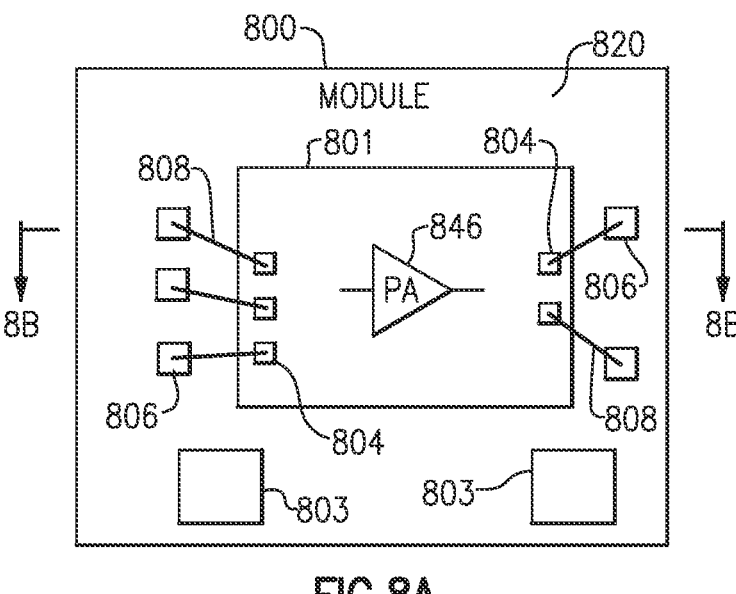
FIG. 8A is a schematic diagram of one embodiment of a packaged module.
Figure 8B:
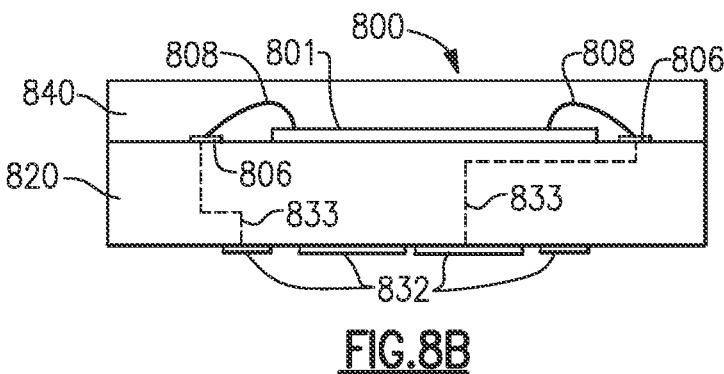
FIG. 8B is a schematic diagram of a cross-section of the packaged module of FIG. 8A taken along the lines 8A-8B.

FIG. 8A is a schematic diagram of one embodiment of a packaged module 800. FIG. 8B is a cross-section of the packaged module 800 of FIG. 8A taken along the lines 8B-8B.

The packaged module 800 includes an IC or die 801, surface mount components 803, wirebonds 808, a package substrate 820, and an encapsulation structure 840. The package substrate 820 includes pads 806 formed from conductors disposed therein. Additionally, the die 801 includes pads 804, and the wirebonds 808 have been used to electrically connect the pads 804 of the die 801 to the pads 806 of the package substrate 820.

The die 801 includes a power amplifier 846, which can be implemented in accordance with any of the embodiments disclosed herein.

The packaging substrate 820 can be configured to receive a plurality of components such as the die 801 and the surface mount components 803, which can include, for example, surface mount capacitors and/or inductors.

As shown in FIG. 8B, the packaged module 800 is shown to include a plurality of contact pads 832 disposed on the side of the packaged module 800 opposite the side used to mount the die 801. Configuring the packaged module 800 in this manner can aid in connecting the packaged module 800 to a circuit board such as a phone board of a wireless device. The example contact pads 832 can be configured to provide RF signals, bias signals, power low voltage(s) and/or power high voltage(s) to the die 801 and/or the surface mount components 803. As shown in FIG. 8B, the electrically connections between the contact pads 832 and the die 801 can be facilitated by connections 833 through the package substrate 820. The connections 833 can represent electrical paths formed through the package substrate 820, such as connections associated with vias and conductors of a multilayer laminated package substrate.

In some embodiments, the packaged module 800 can also include one or more packaging structures to, for example, provide protection and/or facilitate handling of the packaged module 800. Such a packaging structure can include an overmold or encapsulation structure 840 formed over the packaging substrate 820 and the components and die(s) disposed thereon.

It will be understood that although the packaged module 800 is described in the context of electrical connections based on wirebonds, one or more features of the present disclosure can also be implemented in other packaging configurations, including, for example, flip-chip configurations.

Figure 9:
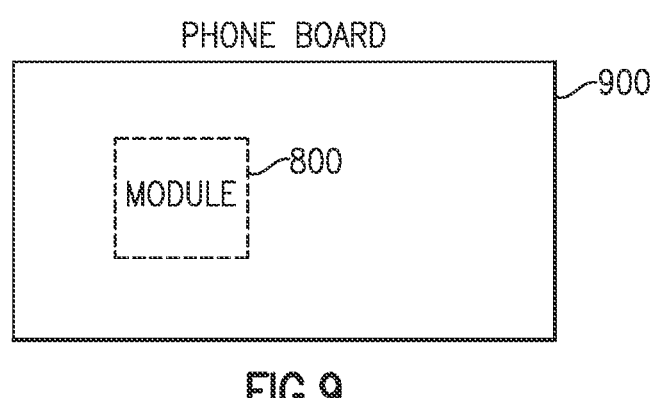
FIG. 9 is a schematic diagram of one embodiment of a phone board.

FIG. 9 is a schematic diagram of one embodiment of a phone board 900. The phone board 900 includes the module 800 shown in FIGS. 8A-8B attached thereto. Although not illustrated in FIG. 9 for clarity, the phone board 900 can include additional components and structures.

Applications

Some of the embodiments described above have provided examples in connection with wireless devices or mobile phones. However, the principles and advantages of the embodiments can be used for any other systems or apparatus that have needs for power amplifiers.

Aspects and embodiments disclosed herein can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled," as generally used herein, refers to two or more elements that may be either directly connected, or connected by way of one or more intermediate elements. Likewise, the word "connected," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

Moreover, conditional language used herein, such as, among others, "can," "could," "might," "e.g.," "for example," "such as," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the embodiments of the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for a user equipment configured to perform an uplink transmission in an unlicensed band in a wireless communication system, the method comprising:

receiving, from a base station, uplink scheduling information of a plurality of sub-bands;

performing a carrier sensing on each of the plurality of sub-bands;

determining a transmission frequency band for the uplink transmission based on the carrier sensing, the determined transmission frequency band being different from the plurality of sub-bands and including at least one idle sub-band among the plurality of sub-bands that is free for transmission;

processing a baseband signal according to a number of sub-bands included in the determined transmission frequency band;

adjusting the processed baseband signal by shifting a frequency of the processed baseband signal by a difference between a center frequency of the plurality of sub-bands and a center frequency of the determined transmission frequency band;

generating a radio frequency (RF) signal of the adjusted baseband signal; and performing the uplink transmission for the generated RF signal to the base station.

2. The method of claim 1 wherein each of the plurality of sub-bands is a bandwidth part that is a subset of contiguous radio bears on a carrier.

3. The method of claim 1 wherein the processed baseband signal includes in-phase (I) signal and quadrature (Q) signals of the baseband signal.

4. The method of claim 1 wherein the processed baseband signal is shifted to a higher frequency range or a lower frequency range using a baseband rotator including a plurality of multipliers based on a pre-stored look-up table.

5. The method of claim 1 wherein determining the transmission frequency band includes selecting a largest number of contiguous sub-bands among the at least one idle sub-band.

6. The method of claim 1 wherein determining the transmission frequency band includes selecting at least one sub-band having a lowest frequency range among the at least one idle sub-band.

7. The method of claim 1 wherein determining the transmission frequency band includes selecting all of the at least one idle sub-bands.

8. The method of claim 7 wherein the determined transmission frequency band includes non-contiguous idle sub-bands that are free for transmission and at least one busy sub-band that is not available for the transmission.

9. The method of claim 8 wherein processing the baseband signal is performed based on a sequence of the non-contiguous idle sub-bands and the at least one busy sub-band.

10. The method of claim 8 further comprising increasing output power of the RF signal before the uplink transmission.

11. A method for a base station configured to perform a downlink transmission in an unlicensed band in a wireless communication system, the method comprising:

configuring downlink scheduling information of a plurality of sub-bands;

performing a carrier sensing on each of the plurality of sub-bands;

determining a transmission frequency band for the downlink transmission based on the carrier sensing, the determined transmission frequency band being different than the plurality of sub-bands and including at least one idle sub-band among the plurality of sub-bands that is free for transmission;

processing a baseband signal according to a number of sub-bands included in the determined transmission frequency band;

adjusting the processed baseband signal by shifting a frequency of the processed baseband signal by a difference between a center frequency of the plurality of sub-bands and a center frequency of the determined transmission frequency band;

generating a radio frequency (RF) signal of the adjusted baseband signal, the RF signal having a center frequency set to a center of the determined transmission frequency band; and performing the downlink transmission for the generated RF signal to a user equipment.

12. The method of claim 11 wherein each of the plurality of sub-bands is a bandwidth part that is a subset of contiguous radio bears on a carrier.

13. The method of claim 11 wherein the processed baseband signal is shifted to a higher frequency range or a lower frequency range using a baseband rotator including plurality of multipliers based on a pre-stored look-up table.

14. The method of claim 11 wherein determining the transmission frequency band includes selecting a largest number of contiguous sub-bands among the at least one idle sub-band.

15. The method of claim 11 wherein determining the transmission frequency band includes selecting at least one sub-band having a lowest frequency range among the at least one idle sub-band.

16. The method of claim 11 wherein determining the transmission frequency band includes selecting all of the at least one idle sub-bands.

17. The method of claim 16 wherein the determined transmission frequency band includes non-contiguous idle sub-bands that are free for transmission and at least one busy sub-band that is not available for the transmission.

18. The method of claim 17 wherein processing the baseband signal is performed based on a sequence of the non-contiguous idle sub-bands and the at least one busy sub-band.

* * * * *